United States Patent [19]

Matsuda et al.

[11] Patent Number: 5,293,571
[45] Date of Patent: Mar. 8, 1994

[54] RECEIPT ACKNOWLEDGEMENT METHOD IN MULTIPLEX TRANSMISSION

[75] Inventors: Yutaka Matsuda; Hiroo Moriue; Kyosuke Hashimoto, all of Hiratsuka; Yoshikazu Nobutoki, Higashihiroshima; Hiroaki Sakamoto, Fukuyama, all of Japan

[73] Assignee: The Furukawa Electric Co., Ltd., Tokyo, Japan

[21] Appl. No.: 932,339

[22] Filed: Aug. 19, 1992

[30] Foreign Application Priority Data

Aug. 23, 1991 [JP] Japan ................... 3-211762

[51] Int. Cl.⁵ .............................. H04J 3/06
[52] U.S. Cl. ................... 370/85.3; 370/105.5
[58] Field of Search ............ 370/85.1, 85.7, 85.8, 370/95.2, 105.1, 85.2, 85.3, 105.5

[56] References Cited

U.S. PATENT DOCUMENTS 4,920,532 4/1990 Wroblewski .................. 370/85.1
4,951,281 8/1990 Muto et al. .................... 370/95.2

Primary Examiner—Douglas W. Olms
Assistant Examiner—Min Jung
Attorney, Agent, or Firm—Frishauf, Holtz, Goodman & Woodward

[57] ABSTRACT

A receipt acknowledgement method which is applied to a multiplex transmission system provided with a plurality of multiple nodes (11 to 17) connected to one another through a multiplex bus (18), and is capable of conducting efficient data transmission, and in which a transmitting multiplex node (13) sends out a frame and, after entry into an ACK signal area of the frame, sends out a delimiter sign consisting of passive and active two bits with a four-bit interval, thereby dividing the acknowledgement signal area. The receiving multiplex nodes (11, 12, 14 to 17) are synchronized according to an active bit sent out from the transmitting multiplex node (13), and returns ACK signals to the ACK signal area in the predetermined order when data transfer on the transmission request frame has been normally performed, whereby data transmission can be conducted at high speed with improved efficiency.

7 Claims, 6 Drawing Sheets

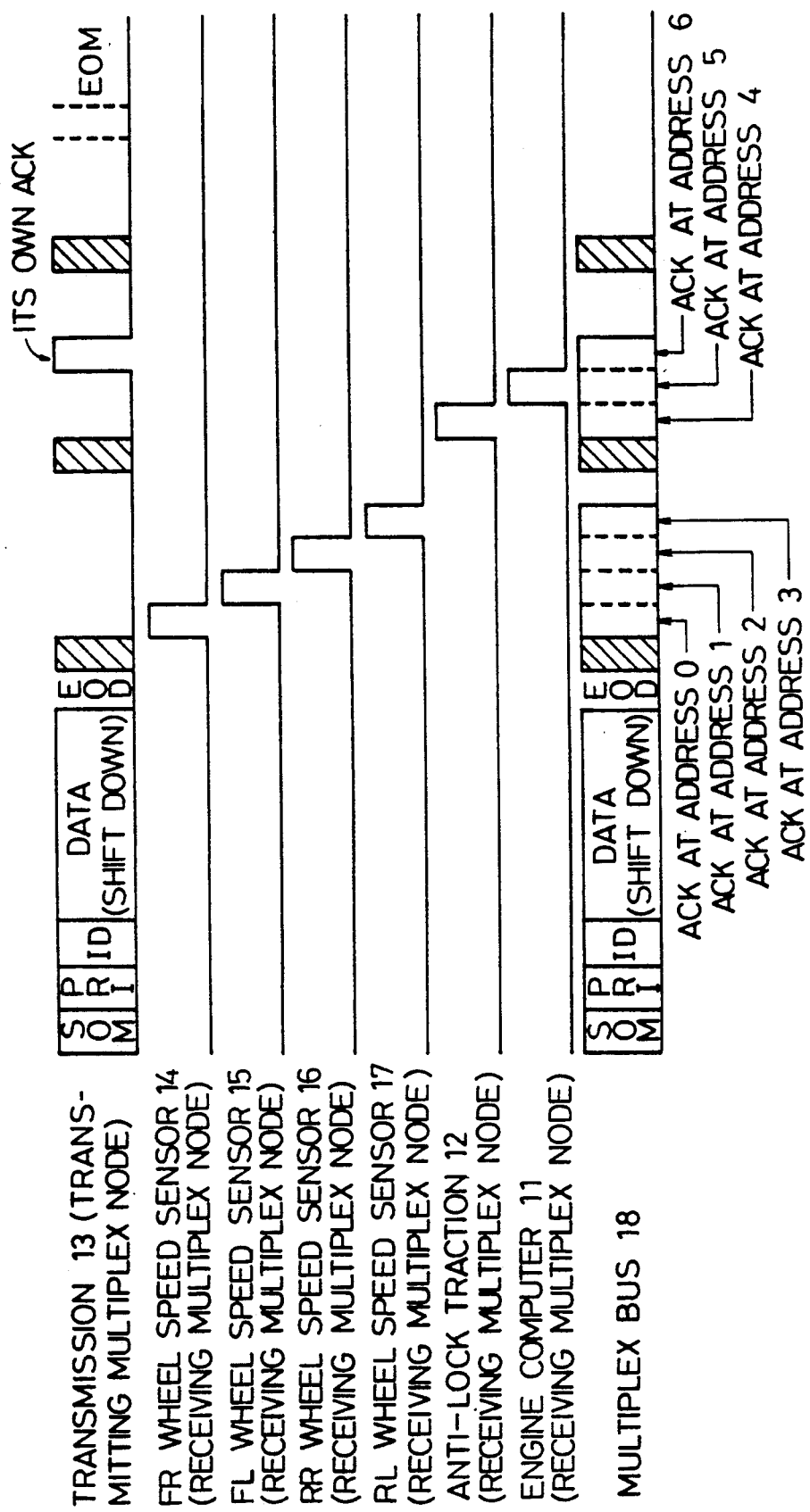

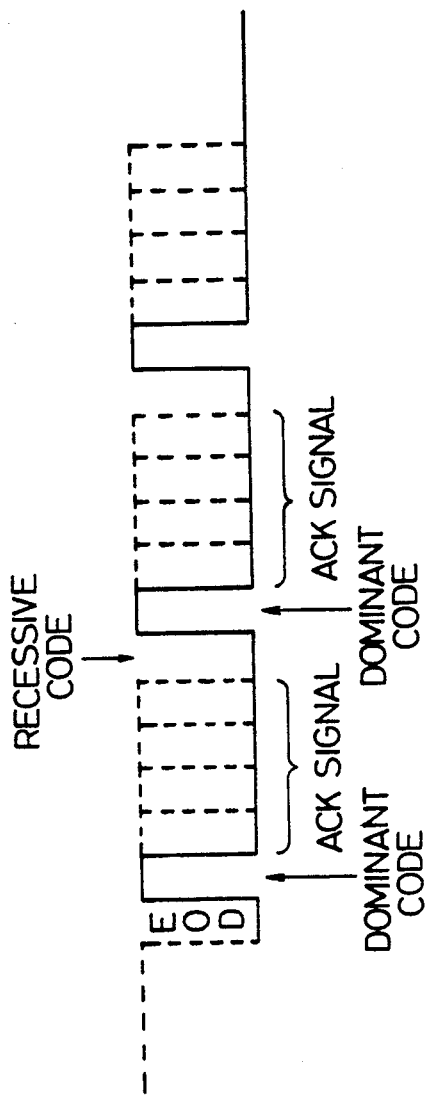
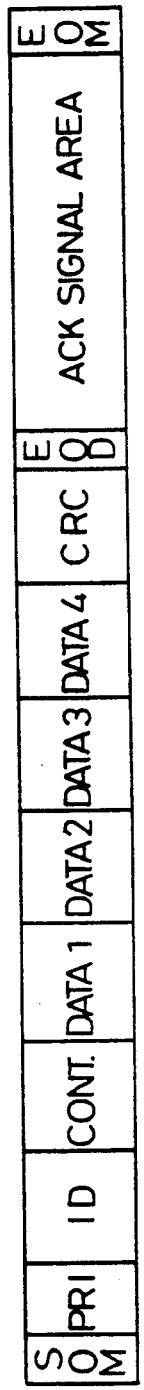

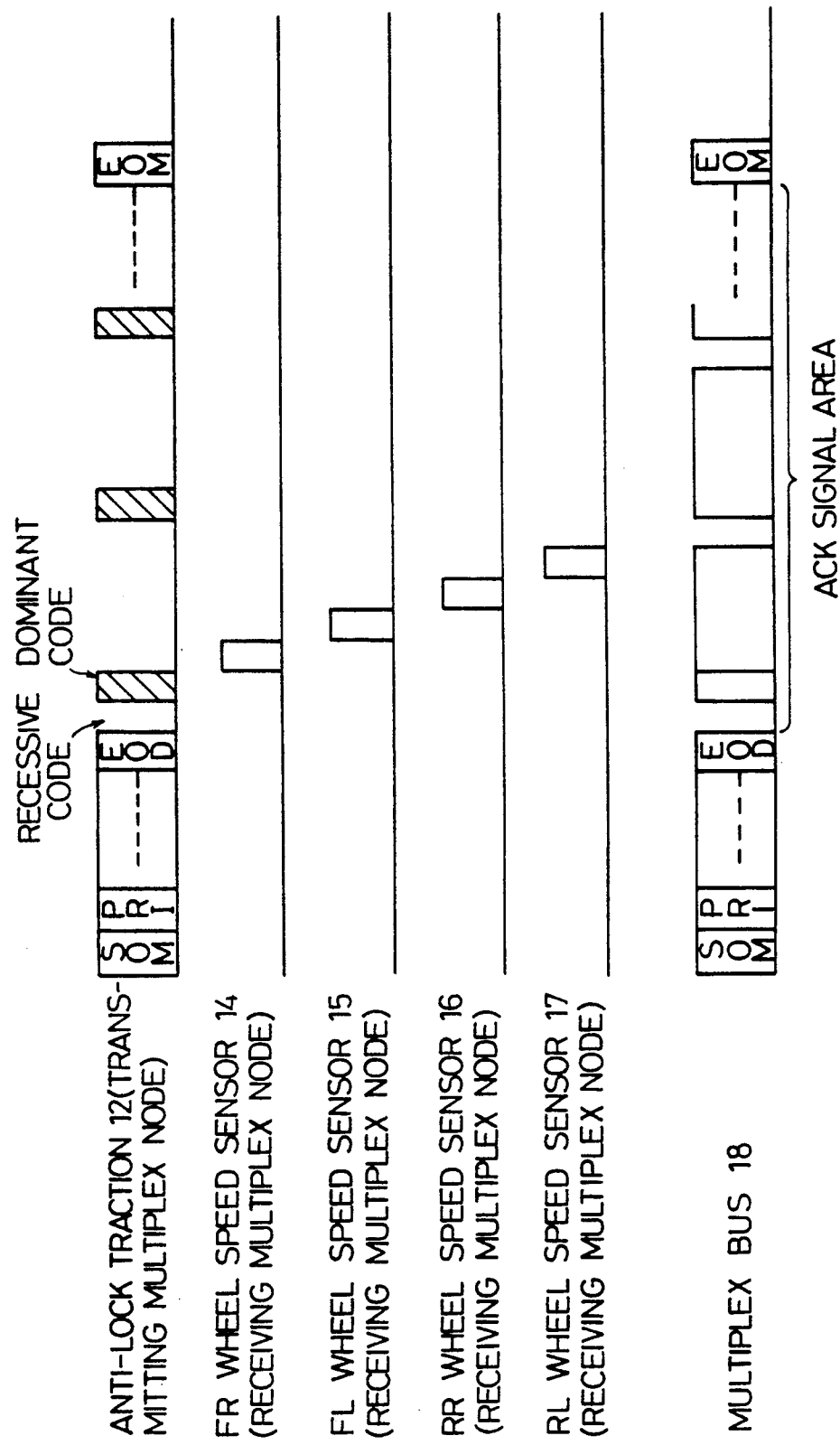

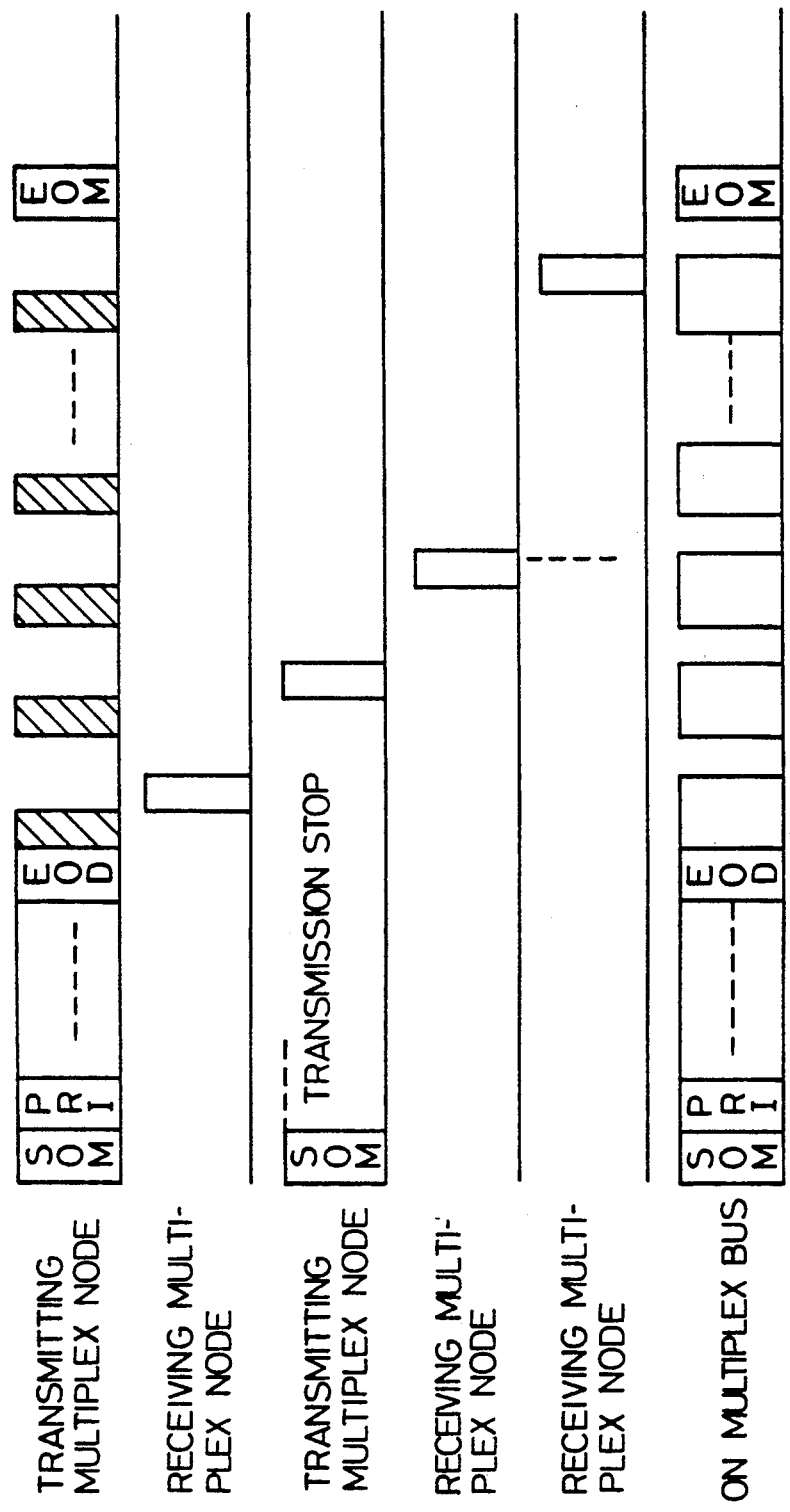

RECEIPT ACKNOWLEDGEMENT METHOD IN MULTIPLEX TRANSMISSION

BACKGROUND OF THE INVENTION

The present invention relates to a method for acknowledging receipt of data or the like in multiplex transmission, and more particularly, to a receipt acknowledgement method for returning an acknowledgement signal with a NRZ (non-return-to-zero) code, to thereby efficiently transmit data in multiplex transmission of a type using carrier sense multiple access with collision detection.

In a network constituted by a plurality of multiplex nodes connected to a common multiplex transmission line, for instance, data transmission is carried out among these nodes. When the nodes are each equipped with a computer for communication and operable independently from one another, these nodes can transmit data to the common transmission line with respective arbitrary timing, so that collision of data can occur on the transmission line.

In order to arbitrate collision of data, a method of carrier sense multiple access with collision detection (CSMA/CD), for example, is applied to the aforementioned type of networks. With the CSMA/CD method, a transmitting node, as one of the plurality of nodes, detects whether the other nodes are using a transmission line or not on the basis of the presence/absence of a carrier, and starts data transmission if the transmission line is not being used. After the start of data transmission, the transmitting node continues to monitor the presence/absence of a data collision on the transmission line. When a collision occurs, the transmitting node interrupts the data transmission, and transmits a jam signal for bringing data transmission by the other nodes into the standby state. More preferably, data transmission is carried out with the aid of CSMA/CD of a non destructive arbitration type. The CSMA/CD of this type is designed such that a dominant code appears on the transmission line when the dominant code collides with a recessive code, and that priority of data is set in advance by using a combination of dominant codes and recessive codes. Upon occurrence of collision of data whose priorities differ from each other, transmission of data with low priority is automatically interrupted, and data with high priority, which takes precedence in transmission, is transmitted, while being prevented from data destruction.

Also known is to transmit data frame by frame, while checking whether or not the thus transmitted data has been received normally. Typically, return of an acknowledgement signal (ACK signal) is requested each time transmission of a data frame is finished, and a judgment is conducted in accordance with the presence/absence of return of the acknowledgement signal, to check whether or not receipt of the data has been made normally. To this end, data frames are each provided with an ACK signal area. More specifically, an ACK signal return area is provided in such a manner that it follows a data frame transmission area along the time axis of data transmission. Each time the ACK signal return area is entered, an ACK signal is returned from each of the nodes which have normally completed receipt of data frame with a timing assigned to the node. Then, each of the ACK signals is stored at a corresponding address position in an ACK signal storage area constituted by, e.g., a buffer memory to which the transmitting node can refer.

Typically, a PWM (pulse width modulation) signal consisting of one logical bit divided into three bit sections (hereinafter referred to as "phase") is used as an ACK signal. As for the PWM signal, first and third phases are fixed at an active signal level and at a passive signal level, respectively, while a second phase takes an active or passive signal level, to thereby represent a state of logic "0" or logic "1".

Specifically, at the first phase of each bit of the ACK signal return area, an active signal, for example, is sent out from a transmitting node onto a multiple bus. Each of the nodes which have normally completed data receipt makes the multiple bus active at the same time as it detects a leading edge of the first phase of the bit area, assigned to the node, of the ACK signal area, and keeps the active state of the multiple bus till the second phase of the above bit area, to thereby make the associated bit show the logic "0" representative of normal receipt. In the meantime, when data is not normally received by a receiving node because of a local error on a network, etc., the above receiving node does not make the multiple bus active even if the leading edge of the first phase of the associated bit area is detected, whereby the second phase of the above bit area is brought into the passive state, so that the above bit shows the logic "1" representative of defective receipt.

In this way, when an ACK signal is not returned from a receiving node, the transmitting node judges an occurrence of abnormality, and resends data. Data is resent, for example, three times at the most till all the receiving nodes registered on ACK management return the ACK signal. And the receiving node which does not return the ACK signal even after data is resent three times is regarded as failure, and deleted from registration. In the meantime, when an ACK signal is newly returned after the local error is solved, the node corresponding to the ACK signal is newly added to the registration.

As mentioned above, when the ACK signal area is constituted with the PWM coding method, a required frequency bandwidth is tripled provided that a data transmission speed is the same, compared with the case where the NRZ (non-return-to-zero) coding method is applied. Thus, with the PWM coding method, radio interference such as spurious radiation can easily occur. Therefore, an ACK signal can not be returned at high speed, and a difficulty such that data transmission can not be sped up is encountered. Also, when the NRZ coding method is simply applied to an ACK signal area for speedup of data transmission, as clock frequency is generally different between multiple nodes in the strict sense, it is hard to take bit synchronization to make each ACK signal correspond to an associated one multiple node.

OBJECT AND SUMMARY OF THE INVENTION

The object of the present invention is to provide a receipt acknowledgement method in multiplex transmission, which makes it possible to conduct data transmission at high speed with sure synchronization.

According to the present invention, in a multiplex transmission in which data transmission is conducted frame by frame among a plurality of nodes connected to one another through a common multiplex transmission line, there is provided a receipt acknowledgement method in which each of receiving nodes which have normally received a data frame returns an acknowledgement signal at predetermined timing, after entry into an acknowledgement signal area of each frame which area follows a data frame area of the frame along a time axis. The receipt acknowledgement method comprises a process in which on and after a time point of entry into an acknowledgement signal area, first signals each consisting of at least one dominant bit are periodically sent out at a predetermined bit interval from a transmitting node consisting of an arbitrary one of the plurality of nodes, and on and after a time point after the entry into the acknowledgement signal area, which time point is determined according to the predetermined bit interval, second signals each consisting of at least one recessive bit are periodically sent out at the predetermined bit interval from the transmitting node. The method further comprises a process in which an acknowledgement signal is returned from each of the normal receiving nodes with an NRZ code in synchronization with a corresponding one dominant bit included in a corresponding one of the first signals periodically sent out from the transmitting node. The predetermined bit interval is set so that such a bit stuff rule is established with respect to the acknowledgement signal area irrespective of the number of the normal transmitting nodes so that when bits of the same sign continue for the number "n" ("n" is an arbitrary integer), at least one bit whose sign is opposite to that of the "n" bits is inserted immediately after the "n" bits. Each of the acknowledgement signal areas is divided into a plurality of small areas. Each small area, starting with the first signal and ending with the second signal, is assigned to those nodes which are less than (n−1) in number and which constitute part of the plurality of nodes, and is constituted by bits which are less than (n+1) in number.

The present invention is advantageous in that data can be transmitted at high speed with sure synchronization, by sending out at least one dominant bit from the transmitting node at the predetermined bit interval, which is set so that the predetermined bit stuff rule is established with respect to the acknowledgement signal area irrespective of the number of normal receiving nodes, on and after the time point of entry into the acknowledgement signal area, and by sending out at least one recessive bit from the transmitting node at the predetermined bit interval on and after the time point determined according to the predetermined bit interval after entry into the acknowledgement signal area, and by returning the acknowledgement signal with the NRZ code from each normal receiving node in synchronization with a corresponding one dominant bit.

BRIEF DESCRIPTION OF THE DRAWINGS

FIG. 2 is a diagram showing a transmission procedure with respect to a normal frame in a receipt acknowledgement method applied to the system shown in FIG. 1;

FIG. 3 is a diagram showing data configuration in an acknowledgement signal area;

FIG. 4 is a diagram showing a transmission procedure with respect to a special frame in the receipt acknowledgement method;

FIG. 5 is a diagram showing an example of a message format;

FIG. 6 is a diagram showing a method of non destructive arbitration type CSMA/CD access.

DETAILED DESCRIPTION

A receipt acknowledgement method in multiplex transmission according to one preferred embodiment of the present invention is applied to, for example, a multiplex transmission system for a car using a method of non destructive arbitration type CSMA/CD access.

Figure 1:
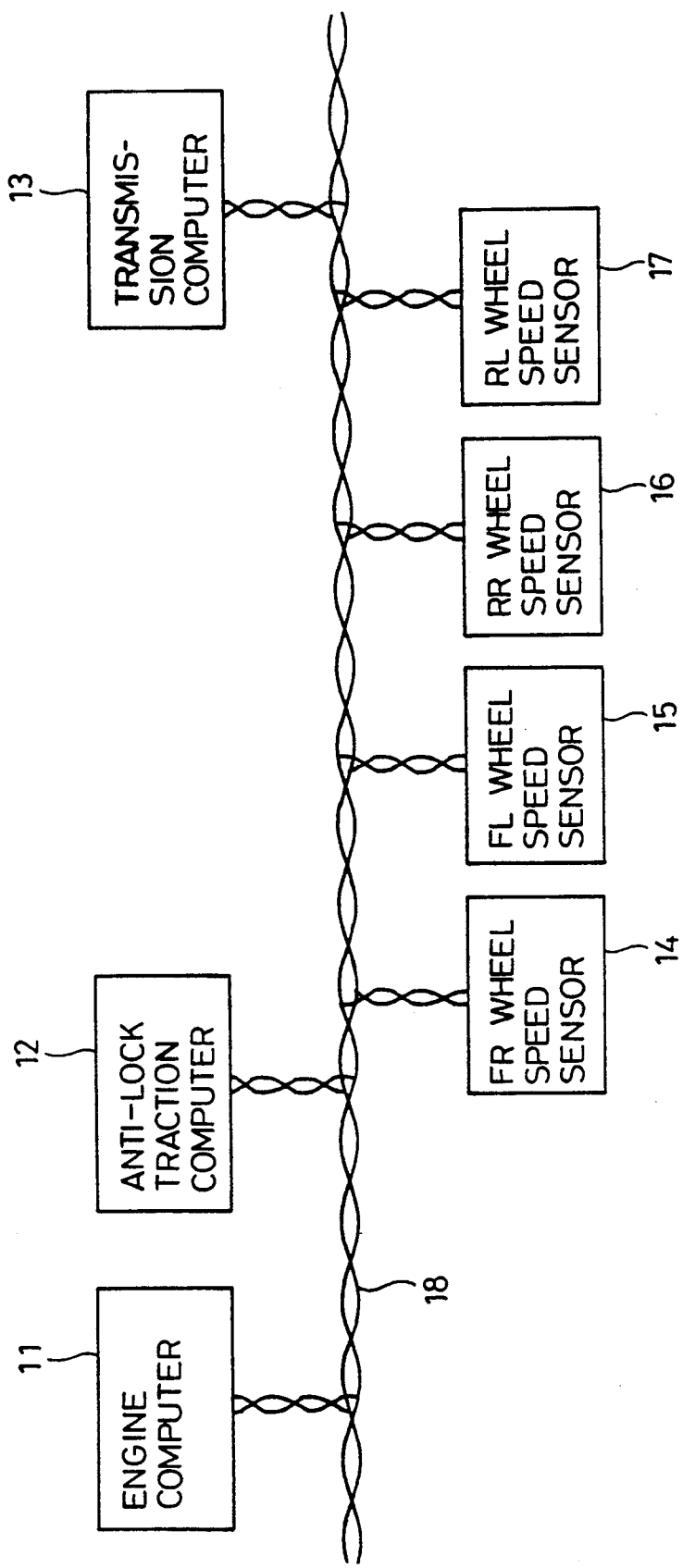
FIG. 1 is a schematic diagram showing a multiplex transmission system for a car to which a receipt acknowledgement method according to one preferred embodiment of the present invention is applied.

Referring to FIG. 1, the multiplex transmission system for a car is provided with an engine computer 11 for controlling fuel injection amount, ignition timing, etc. of an engine mounted in a car, an anti-lock traction computer 12 for controlling a driving force applied on wheels and a brake, a transmission computer 13 for controlling a transmission, and wheel speed sensors 14 to 17 for detecting the speed of wheels of front right (FR), front left (FL), rear right (RR) and rear left (RL), respectively. These elements 11 to 17 are connected to one another through a multiplex bus 18 consisting of a twisted pair cable and so on, whereby a network is constituted for serial multiplex transmission of various signals, for example, wheel speed information used for control of the engine, anti-lock brake, transmission, etc. among the elements 11 to 17 each of which functions as a multiplex node.

Among the multiplex nodes 11 to 17, the wheel speed sensors 14 to 17 which do not have arithmetic and judgment functions for vehicle control are the nodes dependent on the computers 11 to 13, and transmit detected wheel speed information to the computers 11 to 13 after encoding it.

The computers 11 to 13 are operative independently from one another, and capable of transmitting a message to the multiple bus 18 with optional timing, respectively. The message is constituted by, for example, a message format which is normally used in the multiplex transmission method as shown in FIG. 5. Specifically, as shown in FIG. 5, the message includes SOM (Start of Message) indicating the start of the message, a priority (PRI) including data for determining data priority in the case where data is sent out at the same time from more than two of the multiplex nodes 11 to 17 to the multiplex bus 18, a message ID indicating contents of the succeeding data (DATA), a control data area (CONT) including data indicating data length, and a data area (DATA1 to DATA4) of the length (variable length) indicated by the data in the control data area, in this order. The message also includes an error check code such as CRC (cyclic redundancy code), EOD (End of Data) indicating the end of the data, an ACK signal area for making all the multiple nodes return an ACK signal on a bit basis, and EOM (End of Message) indicating the end of the message, in this order.

Data transmission in the network is carried out by a transmission procedure shown in FIG. 6 with the aid of a method of non destructive arbitration type CSMA/CD access using priority data included in each message, whereby only transmission of a message with high priority is continued when messages collide with each other. And when data receipt has been normally completed, each of the multiple nodes return an ACK signal to the position corresponding to a specific address assigned to the node. For example, addresses 0 to 3 are assigned to the wheel speed sensors 14 to 17, respectively, while addresses 4 to 6 are assigned to the computers 11 to 13, respectively. The computers 11 to 13 have a known ACK management function.

Figure 7:
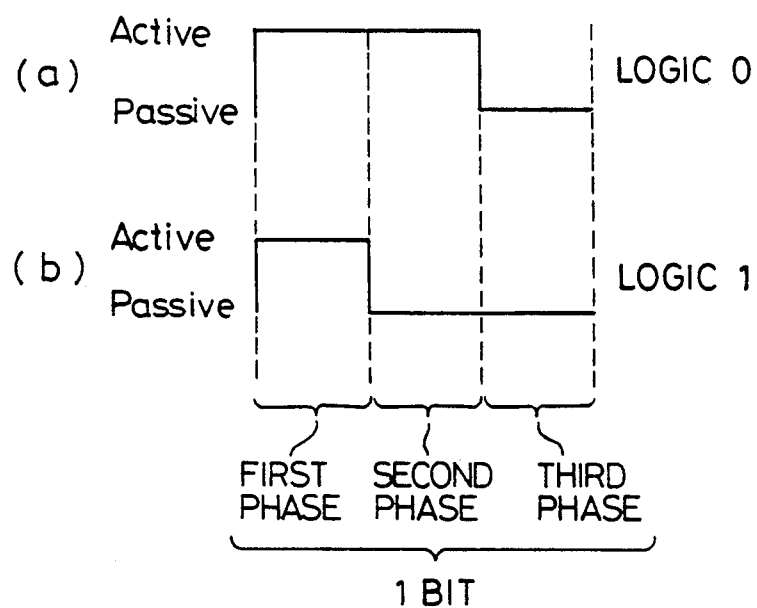
FIG. 7 is a diagram showing a PWM signal used in a conventional receipt acknowledgement method.

In the present embodiment, an NRZ code format is used as a code format of a transmission signal. When an ACK signal is transferred using a PWM code format (FIG. 7) as mentioned above, each of the receiving nodes detects a rise of a first phase of a bit, corresponding to the node, of a predetermined order of bit generation counted from the time point of entry into the ACK signal area. At a second phase of the thus detected bit, each receiving node sends out a signal whose level is determined in dependence on whether the data has been normally received or not, whereby the transmitting mode is enabled to judge whether each of the receiving nodes have normally received the data. That is, in the case of the PWM code format, an ACK signal (more generally, data) is transmitted, while synchronization is ensured between the transmitting side and the receiving side.

According to the NRZ code format, on the other hand, when bits constituting data take the same sign in succession and cause no change in a bus waveform, dispersion in the clock among nodes may hinder synchronization between the transmitting side and the receiving side for a long time. In this case, data transmission becomes impossible.

In the present embodiment using the NRZ code format, in order to enable data transmission even when bits of the same sign succeed, a dummy bit with an inverted sign is inserted by the transmitting side next to the bits in succession of the same sign. As a result, the bus waveform is changed and synchronization can be restored between the transmitting side and the receiving side. The dummy bit is deleted on the receiving side. Such a method is called a bit stuff, which enables restoration of synchronization all the time within a certain predetermined bit length regardless of the bit pattern of data contents.

More specifically, the present embodiment employs such a stuff bit rule that when the same sign continues for five bits, an inverted sign is inserted at the sixth bit. And for realization of this stuff bit rule, in order to divide each of the ACK signal areas into a plurality of small areas with four bits, a dominant bit is sent out from the transmitting multiple node at the beginning of each small area. On the receiving side, each of the receiving nodes returns an ACK signal bit in the order determined in advance, while being synchronized in accordance with the dominant bits which are periodically sent out from the transmitting node. That is, each of the receiving nodes returns the ACK signal with the timing corresponding to a predetermined position of the ACK signal area which position in turn corresponds to the specific address of the node. Also, the transmitting node sends out dominant and recessive bits after the small area, to thereby set the next small area. As a result, regardless of the bit pattern constituted in general by the ACK signals returned from the receiving nodes, the bit stuff rule will not be broken.

With reference to FIG. 2, a transmission procedure of a normal frame in the receipt acknowledgement method according to the present embodiment will be explained, with the case where shift-down of a transmission is requested as an example.

When it is judged that shift-down of a transmission is requested based on sensor information from outside, the transmission computer 13 controls an actuator of the transmission so as to execute shift-down, and informs the computer 11 that shift-down has been executed so that a fuel injection amount is controlled by the engine computer 11.

In communicating the shift-down from the computer 13 to the computer 11, transmission of a message shown in FIG. 5 is started in the multiplex transmission system (FIG. 1).

That is, the sign SOM indicating the start of the message is transmitted first. The code SOM is constituted by, for example, "1" (active) of six bits, which break such a bit stuff rule that when the same sign continues for five bits, one bit of an inverted sign is inserted next for the subsequent bit synchronization, and "0" and "1" for ensuring synchronization. The inverted bit may be a multiple bit of less than four bits, but generally, one bit is enough to restore synchronization by state change on the transmission line.

Thereafter, a priority code (PRI) prescribing precedence of the message, an ID code indicating contents of the data, data areas, a CRC code for error check, and EOD indicating the end of the data are transmitted in this order. When data transmission is finished in this way, the remaining nodes except the transmission computer 13, that is, each of the receiving nodes 11, 12, and 14 to 17 carries out a bit error check of the message and then, judges presence/absence of error using the coding rule check and/or the error check code. And if there is no error and it is judged that data has been normally received, each of the normal receiving nodes sends out an acknowledgement signal to a predetermined location determined by a node address of the acknowledgement signal area, to thereby inform the transmitting side that data has been normally received and retransmission of data is unnecessary.

As shown by way of example in FIG. 3, the acknowledgement signal area is so constituted as to permit all the twelve nodes (including the self-node) to make the ACK return, so that the bit stuff rule is established all the time regardless of the return state of the ACK signal including the case where all the nodes return or do not return the ACK signal.

Each of the receiving nodes which have normally received data check the ID code so as to judge if the node needs that data. In the above case where the transmission computer 13 communicates the shift-down to the engine computer 11, nodes other than the engine computer 11 do not continue processing as judging it as unnecessary data. The engine computer 11 recognizes that the received data is the transmission information data needed by that node based on the ID code included in the data, and further judges that the data is the information on shift-down, and executes required control such as restraining of the fuel injection amount based on the received data.

Referring to FIG. 4, the transmission procedure with respect to a special frame will be described with the case where data transmission to the transmitting node from each of the plurality of receiving nodes is persuaded as an example.

When, for example, a wheel speed signal becomes necessary for control of driving force, the anti-lock traction computer 12 as a transmitting multiple node first sends out a message ID requesting transmission of the wheel speed signal to the multiplex bus 18. Each of the wheel speed sensors 14 to 17 as receiving multiplex nodes which have received this message ID recognizes the presence of the transmission request of the wheel speed sensor signal based on the message ID, and start preparation of sending out of the required data.

Moreover, the anti-lock traction computer 12 sends out control data to the multiplex bus 18. Here, as the computer 12 receives the wheel speed sensor signals consisting of one byte data each from four nodes 14 to 17, data length is designated at four bytes by the control data.

Next, the four wheel speed sensor signals are sent out from these sensors in the preset order, for example, in the order of the sensors 14, 15 16 and 17, and sequentially taken in by the computer 12.

When the wheel speed sensor signals are sent and received normally, each of the wheel speed sensors 14 to 17 sends out an ACK signal to a predetermined location, corresponding to the specific address proper to the sensor, in the ACK signal area, while taking synchronization in accordance with a corresponding one of synchronizing bits which are sequentially sent out from the anti-lock traction computer 12, as a transmitting node, in the ACK signal area.

More specifically, the anti-lock traction computer 12 periodically sends out one-bit active signals, with a five-bit passive area interposed between adjacent active signals. Each of the wheel speed sensors 14 to 17 detects a rise of an active signal which is sent out from the computer 12 for the first time after entry into the ACK signal area and which is set in advance commonly for the four sensors 14 to 17, to thereby ensure synchronization, and sends out the ACK signal to a corresponding one of the first four bits in a five-bit passive area succeeding to the above active signal.

As shown in FIG. 4, when there exist receiving multiplex nodes other than the wheel speed sensors 14 to 17, each of the receiving nodes sends out the ACK signal to a corresponding one bit in a five-bit passive area succeeding to a corresponding one of a one-bit active signal sent out for the second or after that from the computer 12 after entry into the ACK signal area. In this way, after the one-bit active signals sent out periodically from the computer 12, the receiving nodes send out the ACK signals, which are collected sequentially.

Thus, each of the receiving multiplex nodes can get synchronization at the rise of the active signal set in advance for the node, and send out its own ACK signal onto the multiple bus. When there occurs failure or the like in one of the receiving multiplex nodes, e.g., the FR wheel speed sensor 14, so that data transfer is not normally carried out between the anti-lock traction computer 12 and the sensor 14, the ACK signal is not sent from the FR wheel speed sensor 14 to the ACK signal area. Even in this case, the one-bit active signal is sent out in succession to the five-bit passive signal from the anti-lock traction computer 12, whereby each of the receiving multiple nodes of the FL wheel speed sensor 15 and after can transmit the ACK signal to the predetermined location of the ACK signal area. By this, the transmitting multiplex node 12 can judge an occurrence of failure in the respective receiving multiple node 14, 15, 16 or 17 from the fact that the corresponding ACK signal is not returned.

As mentioned above, in the present embodiment using the NRZ system for the code format of a transmission signal, when data receipt has been normally completed, the receiving nodes send out the ACK signals in the predetermined order, while getting synchronization with sync bits sent out at a predetermined interval from the transmitting multiple node in the ACK signal area of a frame, whereby success or failure of data transfer between the transmitting side and the receiving side can be checked. As a result, with sure synchronization between the transmitting side and the receiving side, data can be transmitted at higher speed than that of the PWM method.

Meanwhile, the present embodiment is so designed that the transmitting multiplex node sends out a five-bit passive signal plus one-bit active signal in the ACK signal area. However, in the present invention, the number of bits of a passive signal and that of an active signal are not limited to the above. The present invention may be constituted in any manner only if the stuff bit rule is not broken.

What is claimed is:

1. A receipt acknowledgement method in multiplex transmission in which data transmission is conducted data frame by data frame among a plurality of nodes connected to one another through a common multiple transmission line, each data frame including a data frame area followed by an acknowledgement signal as measured along a time axis, said method being of the type including a step of returning an acknowledgement signal at a predetermined timing from each of receiving ones of normal ones of said nodes which have normally received one said data frame, after entry into the acknowledgement signal area of each data frame, said method comprising the steps of:
   periodically sending out first signals from a transmitting one of said nodes, each said first signal including at least one dominant bit at a predetermined bit interval,
   periodically sending out second signals, each including at least one recessive bit at the predetermined bit interval, from the transmitting node,
   returning an acknowledgement signal from each of the normal receiving nodes in the form of an NRZ code in synchronization with one corresponding said dominant bit included in a corresponding one of the first signals periodically sent out from the transmitting node,
   setting the predetermined bit interval so that a bit stuff rule is established with respect to the acknowledgement signal area irrespective of the number of the normal receiving nodes so that when there are a predetermined number "n" of consecutive bits of the same sign where, at least one bit whose sign is opposite to that of the "n" bits is inserted immediately after the "n" bits, and
   dividing each of the acknowledgement signal areas into a plurality of small areas, each small area starting with a respective said first signal and ending with a respective said second signal, each small area being assigned to less than (n−1) of said plurality of nodes, and including less than (n+1) bits.

2. A receipt acknowledgement method according to claim 1, wherein the step of periodically sending out second signals includes the step of sending out the at least one recessive bit from the transmitting node immediately before the entry into the acknowledgement signal area.

3. A receipt acknowledgement method according to claim 1, wherein the step of periodically sending out first signals includes the step of sending out the at least one dominant bit from the transmitting node immediately before the entry into the acknowledgement signal area.

4. A receipt acknowledgement method according to claim 1, wherein the steps of periodically sending out first and second signals include the steps of sending out the at least one dominant bit and the at least one recessive bit from the transmitting node immediately before the entry into the acknowledgement signal area.

5. A receipt acknowledgement method according to claim 1, wherein the step of periodically sending out second signals includes the step of sending out the at least one recessive bit from the transmitting node after a time point after the entry into the acknowledgement signal area.

6. A receipt acknowledgement method according to claim 1, wherein the step of periodically sending out first signals includes the step of sending out the at least one dominant bit from the transmitting node after a time point after the entry into the acknowledgement signal area.

7. A receipt acknowledgement method according to claim 1, wherein the steps of periodically sending out first and second signals include the steps of sending out the at least one dominant bit and the at least one recessive bit from the transmitting node after a time point after the entry into the acknowledgement signal area.

* * * * *